United States Patent Office 2,838,088
Patented June 10, 1958

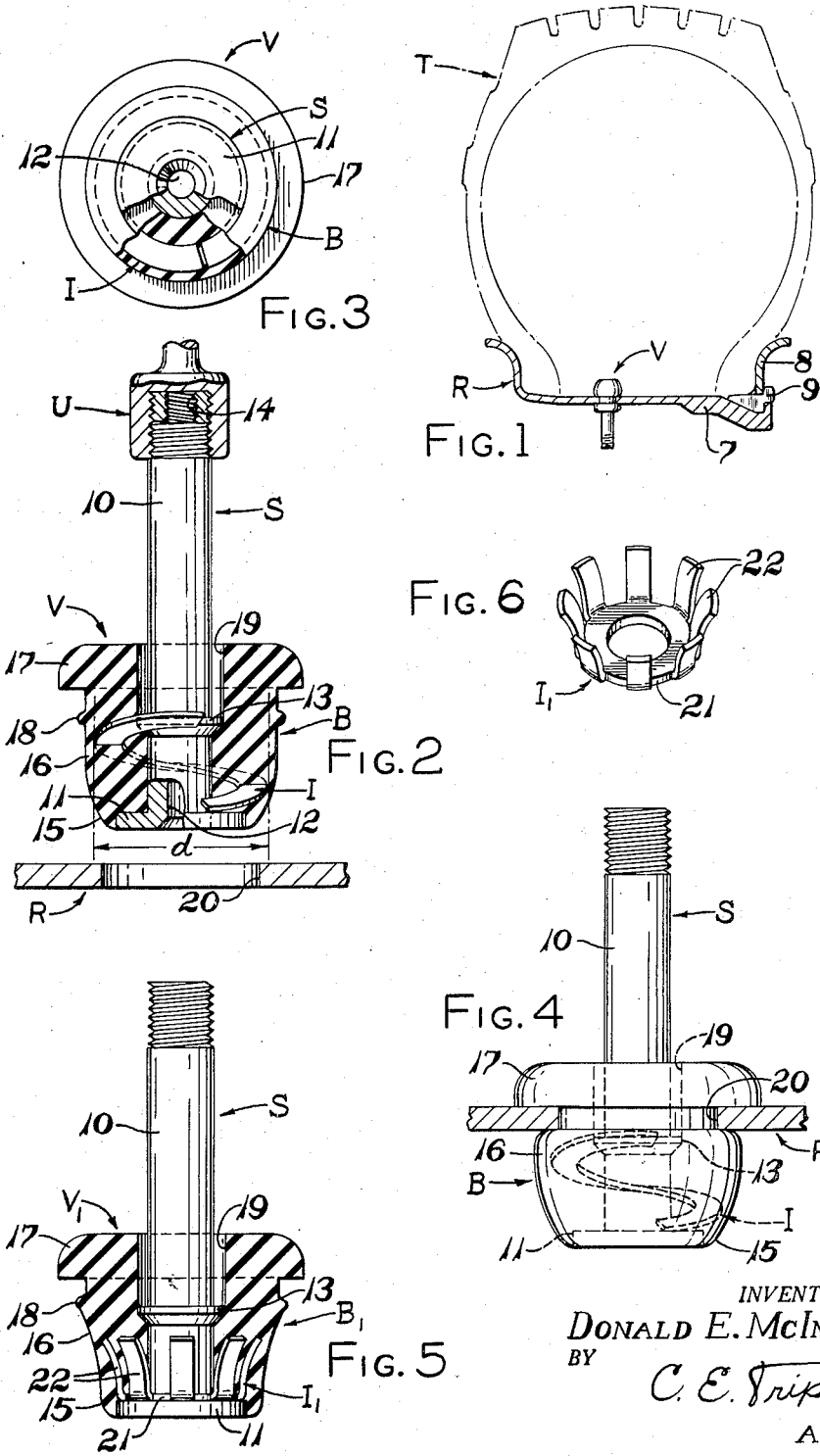

2,838,088

TUBELESS TIRE VALVE

Donald E. McIntire, Cuyahoga Falls, Ohio, assignor to The B. F. Goodrich Company, New York, N. Y., a corporation of New York Application January 4, 1956, Serial No. 557,330

7 Claims. (Cl. 152—427)

This invention relates to valves and is disclosed specifically in a form intended for use as inflation valves for rims for use with tubeless tires of the type wherein the valve has a rubber body for insertion in a tire rim aperture, a valve stem bonded to the body, the assembly being formed for insertion in the rim aperture from the outside, that is, from the inflation side of the valve.

Rubber valves for this service are commonly provided with an inner retaining flange and therefore must be inserted from the inside of the rim but insertion from the outside has several advantages so long as security from dislodgement is assured. Among the advantages of outside insertion are ease of insertion, adaptation to mechanical insertion on a production line, and the ability to insert the valve after the tire is mounted on the rim. The latter feature is of particular importance in truck tire rims which have a flat base over which the inner tire bead must slide, so that if a flanged valve inserted from the inside is fitted, interference with the tire beads may be encountered, but the valve is perfectly suitable for use on one piece drop center rims and get the aforesaid advantages relative to insertion of the valve in the rim.

The feature of this invention is provision of a valve of the type described that automatically adjusts itself to prevent dislodgement under the force of internal air pressure or an external pulling action on the stem. This is attained by molding a special insert in the rubber valve body that is flexible radially and hence can contract and pass through the rim aperture when the valve is inserted by applying a pushing force to the stem (thereby elongating the rubber body) but which radially overlies the rim around the aperture under dislodgement forces that tend to shorten the rubber body. In one form of the invention a flat metal helix is molded in the body and in another axial fingers are included that tend to spread when the body is pushed or pulled outwardly against the rim wall.

The manner in which this invention may be practiced by one skilled in the art will be apparent from the following detailed description of valves embodying the invention.

In the drawings:

Fig. 1 is a section of an assembly of the divided truck rim type;

Fig. 2 shows helical insert form before insertion;

Fig. 3 is an end view of the inside end of the valve with part of the body broken away;

Fig. 4 shows the same form after insertion;

Fig. 5 is a section of a modified form of valve with a finger insert before insertion; and Fig. 6 is a perspective view of the finger insert.

Referring to Fig. 1 of the drawings, a truck rim and tire assembly is shown. The rim R has a base section 7 over which the inner tire bead of tire T is slid before insertion of the valve. The outer tire bead is then pushed in a bit and side ring 8 slid into place far enough to permit insertion of the split locking ring 9 into its groove in base section 7. The valve V is next inserted from the outside in an aperture in the rim base, the internal projection of the valve causing no interference in tubeless tires after the beads are in place on the rim. This invention is not limited to the type of truck rim shown, nor to any specific style of rim.

Referring to Fig. 2 showing the valve before insertion in the rim aperture, the valve V has three major elements, the rubber body B, the metal stem S, and the flexible insert I. The valve core or valve insides is not shown, being of any suitable construction, such devices being universally known.

Referring to Fig. 2, the valve body B has fixed thereto by molding the metal stem S, usually formed of brass for good bonding. The stem S includes the tubular stem proper 10 having an inner flange 11 and is formed with an air passage 12. A flash seal flange 13 may be formed on stem 10, but forms no part of this invention. The air passage 12 has internal threads 14 for the valve core, not shown.

The rubber valve body B is formed of carbon black reinforced rubber having a Shore hardness of about 45 to 65 on scale A. The body has a curved nose 15 terminating at stem flange 11 that is smaller than the rim aperture for insertion. The body has a cylindrical portion 16 larger in diameter than the rim aperture for gripping the rim. The outside end of the body is flanged at 17 to prevent accidental displacement of the valve into the inflation chamber, but this flange (and body) is soft enough so that it can be worked through the rim aperture by a screw driver or other tool to remove the valve inwardly. An inner rib 18 is formed on the body to assist in preventing dislodgement. An annular cavity 19 is molded in the valve body, stopping at the flash seal 13 on the stem.

The insert I is of flat, thin spring stock such as spring brass. It is helical in shape and its diametrical envelope has a normal diameter "$d$" greater than the diameter of the rim aperture 20.

The valve of this form will be formed by dropping the valve stem and helix into a contoured cavity for forming the valve body. The upper part of the mold is recessed to form flange 17 and has a sleeve surrounding the valve stem that engages member 13 on the stem, thus forming the cavity 19. After the mold is closed the rubber is introduced by injection. The method of molding is not part of the invention.

To give typical dimensions, the diameter of the rim aperture may be 5/8", that of cylindrical portion 16 of the rubber body 3/4" and that of insert I some intermediate dimension such as 11/16" although the exact dimensions are not critical and depend largely on the nature of the rubber stock forming the valve body.

In assembling the valve to the rim the rubber body is forced through the rim aperture by means of the stem, with a combined pushing and turning action, which may be applied through a tool U threaded to the stem. Because of the flange on the stem this action tends to elongate the rubber body and reduce its diameter thereby facilitating insertion. The helical insert is also contracted and passes through the aperture. The valve body may be said to be "screwed" into the rim aperture. Water or soap solution may be used as lubricant and is preferably applied solely to the edge of the rim aperture.

The complete assembly assumes the appearance of Fig. 2. The valve body is necked down at the rim and the displaced rubber flows radially outwardly forming a bulge inside the rim that assists in preventing dislodgement. Air pressure against the inner face of the valve merely tends to increase the bulge and add to the security of the mounting, as does pulling on the stem due to flange 11. Also the helical insert I re-expands and overlies the rim wall and any such shortening tends to further expand the helix radially to prevent dislodgement.

Since the rubber stock is not hard, the valve can be removed by forcing flange 17 through the rim aperture with a screw driver or the like, applied successively around the flange. Thus a securely retained, outside-inserted valve assembly is provided, and yet the valve can be removed as desired.

The valve B1 of Fig. 5 differs from that just described only in the form of the insert, although the method of molding may also differ. Here the insert $I_1$ is in the form of a fingered washer having an apertured base 21 that slips over stem 10 and divergent spring fingers 22 extend axially outwardly from the base. The insert is of spring brass or of spring steel or other metal. It is soldered or furnace brazed to the valve stem base, or the fingers may extend integrally from the base, but the latter is believed to be a more costly construction.

In molding the valve of this form, since the fingers are integral with the stem, injection molding is not required and the valve can be compression molded by closing the mold on a slug of rubber. The valve is assembled as before and the fingers 22 can be moved toward the stem as they pass through the rim aperture. When axially outward dislodgment forces are present, the valve body bulges as previously described and the fingers 22 are spread and overlie the rim wall to an even greater extent than they do when the inserted valve is in its relaxed condition. The corresponding typical dimensions are the same as those of the other form of the invention, but as seen in the drawings, the valve body may have a somewhat slimmer contour.

Having described the invention in detail and that one skilled in the art may practice it, I claim:

1. A snap-in inflation valve for mounting in an apertured wheel rim to form part of a tubeless tire assembly, comprising a generally cylindrical body of rubber having an integral flange at the outside end for engaging the outside wall of a wheel rim, a rigid valve stem moulded in said body coaxially therewith, said valve stem having a flange disposed at the end of said rubber body opposite the rubber flange, and a flexible radially deformable metal insert in said rubber body having an axis of symmetry substantially coincident with the axis of said body, said insert having a radial dimension greater than that of the rim aperture, the diameter of said cylindrical body being greater than that of the rim aperture.

2. In combination, an apertured tire rim a snap-in inflation valve mounted in the aperture in said rim, said valve comprising a generally cylindrical body of rubber having an integral flange at the outside end engaging the outside wall of said rim, a rigid valve stem moulded in said body coaxially therewith, said valve stem having a flange disposed at the end of said rubber body opposite the rubber flange, and a flexible radially deformable metal insert in said rubber body having an axis of symmetry substantially coincident with the axis of said body, said insert having a radial dimension greater than that of the rim aperture, the diameter of said cylindrical body being normally greater than that of the rim aperture, insertion of said rubber body in said rim aperture causing the rubber of the body to flow and neck down at the rim aperture, and bulge out inside the rim, said insert resisting axial outward withdrawal of the valve from the rim.

3. A snap-in inflation valve for mounting in an apertured wheel rim to form part of a tubeless tire assembly, comprising a generally cylindrical body of rubber having an integral flange at the outside end for engaging the outside wall of a wheel rim, a rigid valve stem moulded in said body said valve stem having a flange disposed at the end of said rubber body opposite the rubber flange, and a flexible radially deformable helical metal insert in said rubber body having a radial dimension greater than that of the rim aperture, the major diameter of said cylindrical body where it joins said flange also being greater than that of the rim aperture.

4. A snap-in inflation valve for mounting in an apertured wheel rim to form part of a tubeless tire assembly, comprising a generally cylindrical body of rubber having an integral flange at the outside end for engaging the outside wall of a wheel rim, a rigid valve stem moulded in said body said valve stem having a flange disposed at the end of said rubber body opposite the rubber flange, and a metal insert in said rubber body having a base portion adjacent said valve stem flange and fingers extending axially away from said base portion toward said rubber flange, said fingers being radially movable in response to radial constriction of the rubber of said body, the envelope of the ends of said fingers having a radial dimension greater than the diameter of the rim aperture, the diameter of said cylindrical body being greater than that of the rim aperture.

5. In combination, an apertured tire rim a snap-in inflation valve mounted in the aperture in said rim, said valve comprising a generally cylindrical body of rubber having an integral flange at the outside end engaging the outside wall of said rim, a rigid valve stem moulded in said body said valve stem having a flange disposed at the end of said rubber body opposite the rubber flange, and a flexible radially deformable helical metal insert in said rubber body having a radial dimension greater than that of the rim aperture, the diameter of said cylindrical body being normally greater than that of the rim aperture, insertion of said rubber body in said rim aperture causing the rubber of the body to flow and neck down at the rim aperture, and bulge out inside the rim, said insert resisting axial outward withdrawal of the valve from the rim.

6. In combination, an apertured tire rim a snap-in inflation valve mounted in the aperture in said rim, said valve comprising a generally cylindrical body of rubber having an integral flange at the outside end engaging the outside wall of said rim, a rigid valve stem moulded in said body said valve stem having a flange disposed at the end of said rubber body opposite the rubber flange, and a metal insert in said rubber body having a base portion adjacent said valve stem flange and fingers extending axially away from said base portion toward said rubber flange, said fingers being radially movable in response to radial constriction of the rubber of said body, the envelope of the ends of said fingers having a radial dimension greater than the diameter of the rim aperture, the diameter of said cylindrical body being normally greater than that of the rim aperture, insertion of said rubber body in said rim aperture causing the rubber of the body to flow and neck down at the rim aperture, and bulge out inside the rim, said insert resisting axial outward withdrawal of the valve from the rim.

7. A snap-in inflation valve for mounting in an apertured wheel rim to form part of a tubeless tire assembly, comprising a generally cylindrical body of rubber having an integral flange at the outside end for engaging the outside wall of a wheel rim, a rigid valve stem moulded in said body coaxially therewith, and a flexible radially deformable metal insert in said rubber body having an axis of symmetry substantially coincident with the axis of said body, said insert having a radial dimension greater than that of the rim aperture, the diameter of said cylindrical body being greater than that of the rim aperture.

References Cited in the file of this patent

UNITED STATES PATENTS 2,798,530     Nonnamaker _____ July 9, 1957